United States Patent [19]
Mortimer

[11] Patent Number: 6,099,012
[45] Date of Patent: Aug. 8, 2000

[54] CYCLE TRAILER HITCH ADAPTER

[76] Inventor: William W. Mortimer, 4465 S. Clubview Dr., Adrian, Mich. 49221

[21] Appl. No.: 09/130,610

[22] Filed: Aug. 6, 1998

[51] Int. Cl.[7] ................................................. B60P 3/06
[52] U.S. Cl. ........................... 280/402; 280/292; 414/462
[58] Field of Search ................................. 280/402, 292; 414/462, 463; 224/924, 534, 537

[56] References Cited

U.S. PATENT DOCUMENTS

| | | | |
|---|---|---|---|
| 3,776,572 | 12/1973 | Bane | 280/292 |
| 3,778,087 | 12/1973 | Kallenbach | 280/292 |
| 3,822,898 | 7/1974 | Brownlie | 280/402 |
| 4,592,564 | 6/1986 | Warnock et al. | 280/402 |
| 5,123,802 | 6/1992 | Bell | 280/402 |
| 5,145,308 | 9/1992 | Vaughn et al. | 414/462 |
| 5,620,197 | 4/1997 | Howes | 280/402 |
| 5,674,044 | 10/1997 | Ranes | 280/402 |
| 5,794,959 | 8/1998 | Scheef, Jr. | 280/402 |
| 5,988,974 | 11/1999 | Zackovich | 280/402 |

Primary Examiner—Daniel G. DePumpo
Attorney, Agent, or Firm—Joseph N. Breaux

[57] ABSTRACT

A cycle trailer hitch adapter that is connectable to the rear of a vehicle using a receiver hitch connection for towing a motorcycle behind the vehicle. The cycle trailer hitch adapter includes a hitch connecting structure insertable into and lockable in connection with a receiver hitch, a cycle securing assembly in connection with the connecting structure, an adjustable height cycle front tire receiving shoe in connection with the cycle securing assembly, and a tire ramp that is detachably securable to the cycle front tire receiving shoe.

1 Claim, 4 Drawing Sheets

CYCLE TRAILER HITCH ADAPTER

TECHNICAL FIELD

The present invention relates to vehicle towing devices and the like and more particularly to a cycle trailer hitch adapter that is attachable to the receiver hitch of a vehicle for towing a two or three wheeled cycle behind the vehicle by supporting and holding the front wheel of the cycle; the cycle trailer hitch including a hitch connecting structure insertable into and lockable in connection with a receiver hitch, a cycle securing assembly in connection with the connecting structure, an adjustable height cycle front tire receiving shoe having a shoe height adjustment mechanism including a connector bolt assembly, and a tire ramp that is detachably securable to the cycle front tire receiving shoe; the cycle securing assembly including two adjustable length cycle securing straps, a removable strap spacing and cinch bar, and a spring loaded locking pin assembly including a spacing and cinch bar guide tube; the spring loaded locking pin assembly being attached to a top surface of the hitch connecting structure and including a slidable entrapped locking pin, a locking pin biasing spring, a retaining pin extending radially from the locking pin, a retaining pin insertion detent formed into the sidewall of a biasing spring retaining structure, and a spacing and cinch bar guide tube sized and shaped to slidingly receive therein the spacing and cinch bar when the locking pin is withdrawn therefrom and held in a retracted position by positioning the retaining pin into the retaining pin insertion indent; the spacing and cinch bar having strap connecting slots formed through the ends thereof and a centrally located locking pin receiving aperture formed into a top surface thereof; the slidably entrapped locking pin being of sufficient length and biased into a position by the locking pin biasing spring to engage the centrally located locking pin receiving aperture formed into the top surface of the spacer and cinch bar when the center of the spacer and cinch bar is positioned within the spacing and cinch bar guide tube; the adjustable height cycle front tire receiving shoe having a vertical channel portion, a diagonal channel portion, a horizontal channel portion, a pin receiving aperture formed into a rear end of the horizontal channel portion, and two identical spaced channel connector plates extending away from a back surface of the vertical channel portion; the two identical spaced channel connector plates forming a portion of the height adjustment mechanism; each channel connector plate having two vertical shoe attachment tube attachment apertures provided therethrough; the tire ramp including a ramp channel member terminating in one end in a ramp alignment inset that is positionable into the rear end of the horizontal channel portion of the cycle front tire receiving shoe; the ramp alignment inset having a ramp securing pin extending away from an under surface thereof that is sized to frictionally engage the ramp pin receiving aperture formed into a rear end of the horizontal channel portion; the hitch connecting structure having a hitch securing pin aperture formed therethrough at one end thereof and a vertical shoe attachment tube that forms another portion of the shoe height adjustment mechanism attached to a far end thereof; the connector bolt assembly including a connector bolt and a compassionately threaded connector nut; the vertical shoe attachment tube being sized to fit laterally between the two identical spaced channel connector plates and having a number of connecting aperture pairs spaced along the length thereof; the connector bold assembly being simultaneously securable through one of the two vertical shoe attachment tube attachment apertures of each spaced connector plate and one pair of the number of connecting aperture pairs of the vertical shoe attachment tube to affix the adjustable height front tire receiving shoe to the hitch connecting structure.

BACKGROUND ART

It is often desirable to tow a motorcycle or the like to a location for riding. Although towing the motorcycle can be desirable, it is often difficult to attach a towing device to a vehicle and to then secure the motorcycle to the towing device. It would be desirable, therefore, to have a towing device for towing motorcycles or the like behind a vehicle such as a car or truck. Because many cars and trucks already have receiver hitches, it would be further benefit to have a device for towing motorcycles and the like that is attachable to a vehicle with a receiver hitch connection.

GENERAL SUMMARY DISCUSSION OF INVENTION

It is thus an object of the invention to provide a cycle trailer hitch adapter that is connectable to the rear of a vehicle for towing a motorcycle behind the vehicle.

It is a further object of the invention to provide a cycle trailer hitch adapter that is attachable to a vehicle with a receiver hitch connection.

It is a still further object of the invention to provide a cycle trailer hitch adapter that includes a hitch connecting structure insertable into and lockable in connection with a receiver hitch, a cycle securing assembly in connection with the connecting structure, an adjustable height cycle front tire receiving shoe having a shoe height adjustment mechanism including a connector bolt assembly, and a tire ramp that is detachably securable to the cycle front tire receiving shoe; the cycle securing assembly including two adjustable length cycle securing straps, a removable strap spacing and cinch bar, and a spring loaded locking pin assembly including a spacing and cinch bar guide tube; the spring loaded locking pin assembly being attached to a top surface of the hitch connecting structure and including a slidably entrapped locking pin, a locking pin biasing spring, a retaining pin extending radially form the locking pin, a retaining pin insertion detent formed into the sidewall of a biasing spring retaining structure, and a spacing and cinch bar guide tube sized and spaced to slidingly receive therein the spacing and cinch bar when the locking pin is withdrawn therefrom and held in a retracted position by positioning the retaining pin into the retaining pin insertion indent; the spacing and cinch bar having strap connecting slots formed through the ends thereof and a centrally located locking pin receiving aperture formed into a top surface thereof; the slidably entrapped locking pin being of sufficient length and biased into a position by the locking pin biasing spring to engage the centrally located locking pin receiving aperture formed into the top surface of the spacer and cinch bar when the center of the spacer and cinch bar is positioned within the spacing and cinch bar guide tube; the adjustable height cycle front tire receiving shoe having a vertical channel portion, a diagonal channel portion, a horizontal channel portion, a pin receiving aperture formed into a rear end of the horizontal channel portion, and two identical spaced channel connector plates extending away from a back surface of the vertical channel portion; the two identical spaced channel connector plates forming a portion of the height adjustment mechanism; each channel connector plate having two vertical shoe attachment tube attachment apertures provided therethrough; the tire ramp including a ramp channel member terminating in one end in a ramp alignment inset that is positionable into the rear end of the horizontal channel portion of the cycle front tire receiving shoe; the ramp alignment inset having a ramp securing pin extending away from an under surface thereof that is sized to frictionally engage the ramp pin receiving aperture formed into a rear end of the horizontal channel portion; the hitch connecting structure having a hitch securing pin aperture formed therethrough at one end thereof and a vertical shoe attachment tube that forms another portion of the shoe height adjustment mechanism attached to a far end thereof; the connector bolt assembly including a connector bolt and a companionately threaded connector nut; the vertical shoe attachment tube being sized to fit laterally between the two identical space channel connector plates and having a number of connecting aperture pairs spaced along the length thereof; the connector bolt assembly being simultaneously securable through one of the two vertical shoe attachment tube attachment apertures of each spaced connector plate and one pair of the number of connecting aperture pairs of the vertical shoe attachment tube to affix the adjustable height front tire receiving shoe to the hitch connecting structure.

It is a still further object of the invention to provide a cycle trailer hitch adapter that accomplishes some or all of the above objects in combination.

Accordingly, a cycle trailer hitch adapter is provided. The cycle trailer hitch adapter includes a hitch connecting structure insertable into and lockable in connection with a receiver hitch, a cycle securing assembly in connection with the connecting structure, an adjustable height cycle front tire receiving shoe having a shoe height adjustment mechanism including a connector bolt assembly, and a tire ramp that is detachably securable to the cycle front tire receiving shoe; the cycle securing assembly including two adjustable length cycle securing straps, a removable strap spacing and cinch bar, and a spring loaded blocking pin assembly including a spacing and cinch bar guide tube; the spring loaded locking pin assembly being attached to a top surface of the hitch connecting structure and including a slidably entrapped locking pin, a locking pin biasing spring, a retaining pin extending radially form the locking pin, a retaining pin insertion detent formed into the sidewall of a biasing spring retaining structure, and a spacing and cinch bar guide tube sized and shaped to slidingly receive therein the spacing and cinch bar when the locking pin is withdrawn therefrom and held in a retracted position by positioning the retaining pin into the retaining pin insertion indent; the spacing and cinch bar having strap connecting slots formed through the ends thereof and a centrally located locking pin receiving aperture formed into a top surface thereof; the slidably entrapped locking pin being of sufficient length and biased into a position by the locking pin biasing spring to engage the centrally located locking pin receiving aperture formed into the top surface of the spacer and cinch bar when the center of the spacer and cinch bar is positioned within the spacing and cinch bar guide tube; the adjustable height cycle front tire receiving shoe having a vertical channel position, a diagonal channel portion, a horizontal channel portion, a pin receiving aperture formed into a rear end of the horizontal channel portion, and two identical spaced channel connector plates extending away from a back surface of the vertical channel portion; the two identical spaced channel connector plates forming a portion of the height adjustment mechanism; each channel connector plate having two vertical shoe attachment tube attachment apertures provided therethrough; the tire ramp including a ramp channel member terminating in one end in a ramp alignment inset that is positionable into the rear end of the horizontal channel portion of the cycle front tire receiving shoe; the ramp alignment inset having a ramp securing pin extending away from an under surface thereof that is sized to frictionally engage the ramp pin receiving aperture formed into a rear end of the horizontal channel portion; the hitch connecting structure having a hitch securing pin aperture formed therethrough at one end thereof and a vertical shoe attachment tube that forms another portion of the shoe height adjustment mechanism attached to a far end thereof; the connector bolt assembly including a connector bolt and a companionately threaded connector nut; the vertical shoe attachment tube being sized to fit laterally between the two identical spaced channel connector plates and having a number of connecting aperture pairs spaced along the length thereof; the connector bolt assembly being simultaneously securable through one of the two vertical shoe attachment tube attachment apertures of each spaced connector plate and one pair of the number of connecting aperture pairs of the vertical shoe attachment tube to affix the adjustable height front tire receiving shoe to the hitch connecting structure.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
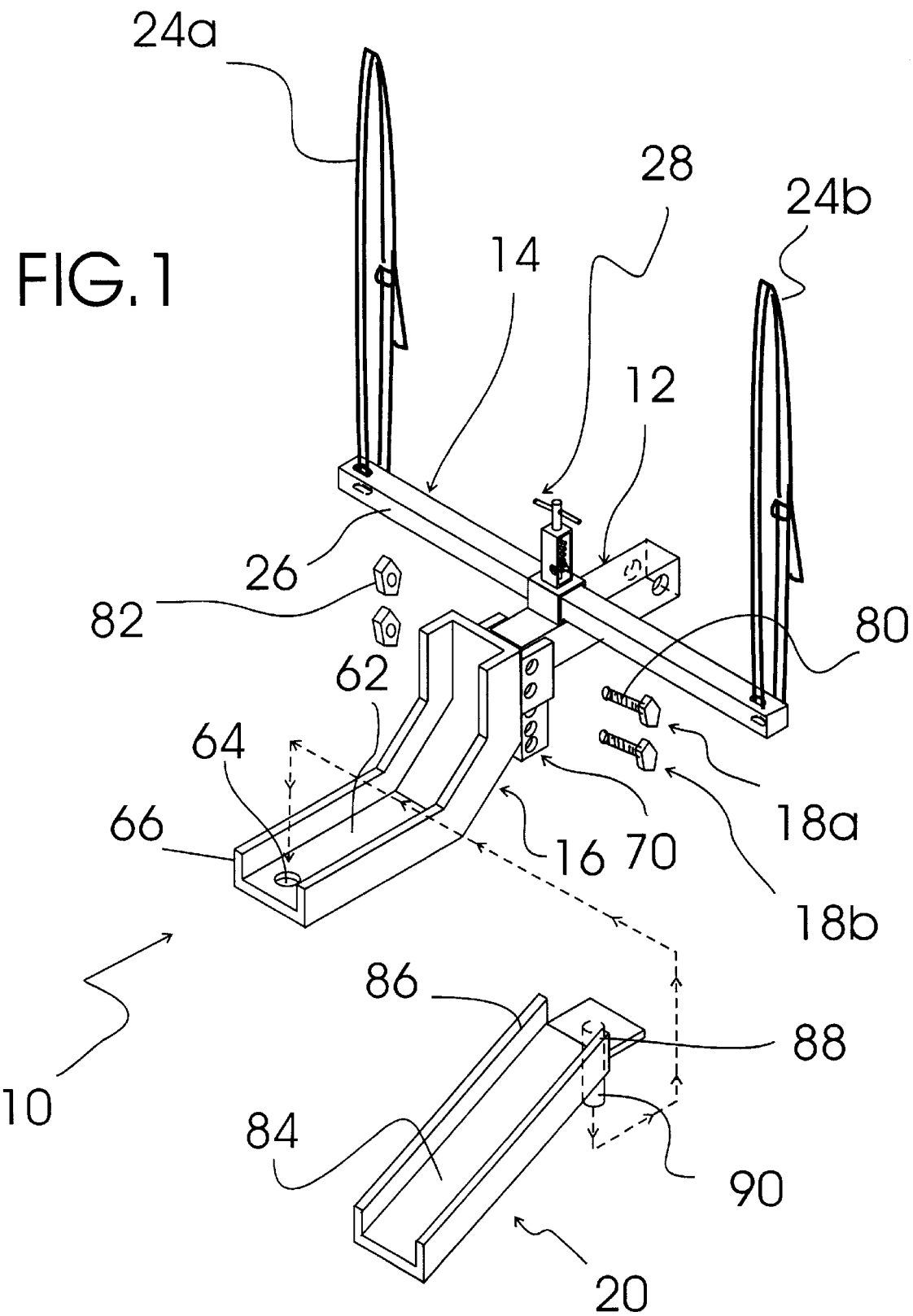
FIG. 1 is a perspective view of an exemplary embodiment of the cycle trailer hitch adapter of the present invention showing the hitch connecting structure; the cycle securing assembly including the two adjustable length cycle securing straps, the removable strap spacing and cinch bar and the spring loaded locking pin assembly including the spacing and cinch bar guide tube; the adjustable height cycle front tire receiving shoe with the shoe height adjustment mechanism and the ramp pin receiving aperture; two connecting bolt assemblies, and the tire ramp with the ramp alignment inset and the ramp securing pin.

FIG. 1 shows an exemplary embodiment of the cycle trailer hitch adapter of the present invention generally designated by the numeral 10. In this embodiment cycle trailer hitch adapter 10 includes a hitch connecting structure, generally designated 12; a cycle securing assembly, generally designated 14; an adjustable height cycle front tire receiving shoe, generally designated 16; two connecting bolt assemblies, generally designated 18a, 18b; and a tire ramp, generally designated 20.

Figure 2:
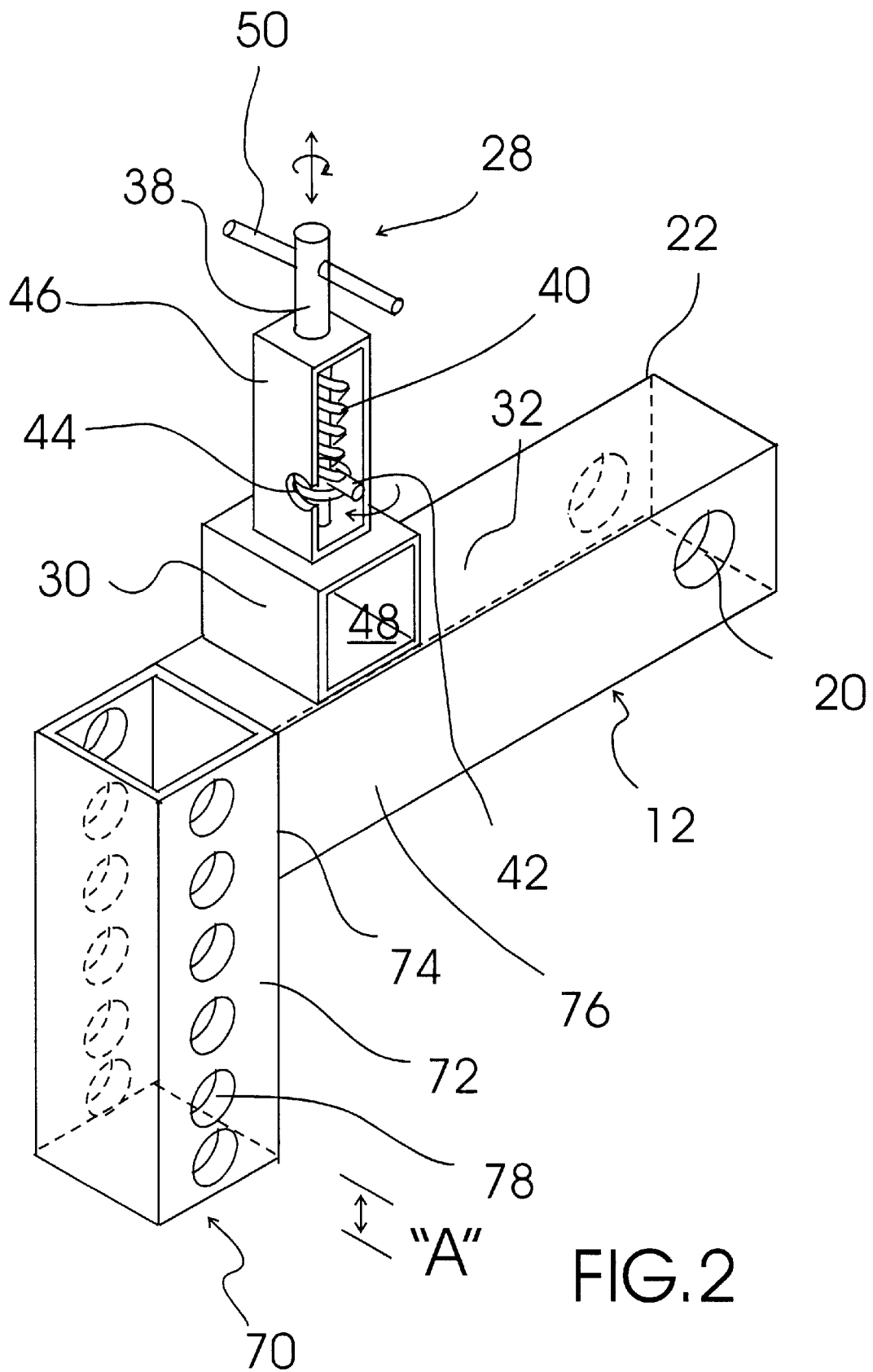
FIG. 2 is a perspective view showing the hitch securing pin aperture of the hitch connecting structure; the spring loaded locking pin assembly attached to a top surface of the hitch connecting structure including the locking pin biasing spring, the retaining pin, the retaining pin insertion detent, and the spacing and cinch bar guide tube; and the vertical shoe attachment tube of the shoe height adjustment mechanism welded to the far end of the hitch connecting structure and having a number of connecting aperture pairs spaced along the length thereof on one inch centers.

With reference to FIG. 2, hitch connecting structure 12 is constructed from a length of square profile metal tubing having a hitch securing pin aperture 20 formed through an insertion end 22 thereof. Insertion end 22 is insertable into and lockable in connection with a conventional receiver hitch mount secured to the rear of a vehicle.

Referring back to FIG. 1, cycle securing assembly 14 includes two adjustable length, nylon webbing, cycle securing straps 24a, 24b; a removable strap spacing and cinch bar 26, and a spring loaded locking pin assembly, generally designated 28. With reference to FIG. 2, spring loaded locking pin assembly 28 includes a slidably entrapped locking pin 38, a locking pin biasing spring 40, a retaining pin 42 extending radially from locking pin 38, a retaining pin insertion detent 44 formed into a sidewall edge of a four sided, rectangular biasing spring retaining structure 46, and a spacing and cinch bar guide tube 30 that is sized and shaped to slidingly receive therein spacing and cinch bar 26 (FIG. 1) when the lower end of locking pin 38 is withdrawn from the bar receiving passageway 48 thereof and held in a retracted position by positioning retaining pin 42 into retaining pin insertion indent 44 using a handle 50 provided at the top of locking pin 38.

Figure 2A:
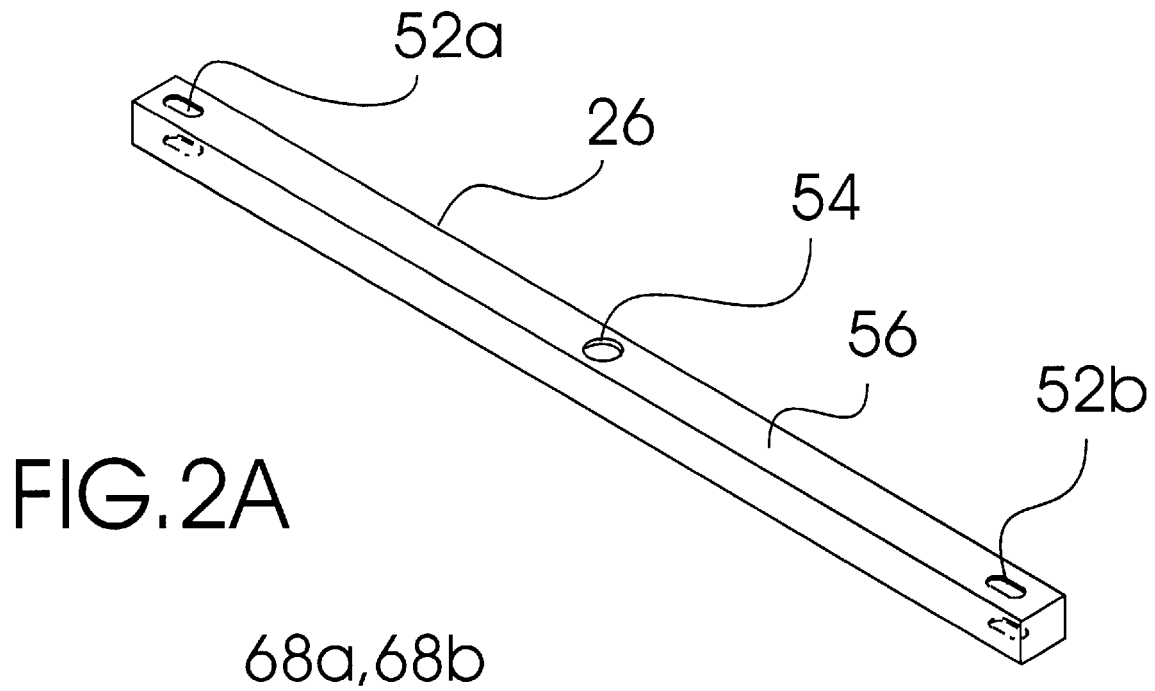
FIG. 2A is a perspective view of the spacer and cinch bar in isolation with the adjustable length strap assemblies removed showing the strap connecting slots formed through the ends thereof and the centrally located locking pin receiving aperture formed into a top surface thereof.

With reference to FIG. 2A, spacing and cinch bar 26 is a length of square metal tubing having two pairs of aligned strap connecting slots 52a, 52b formed through the ends thereof and a centrally located locking pin receiving aperture 54 formed into a top surface 56 thereof that is sized to receive and engage the bottom end of locking pin 38 (FIG. 2).

Figure 4:
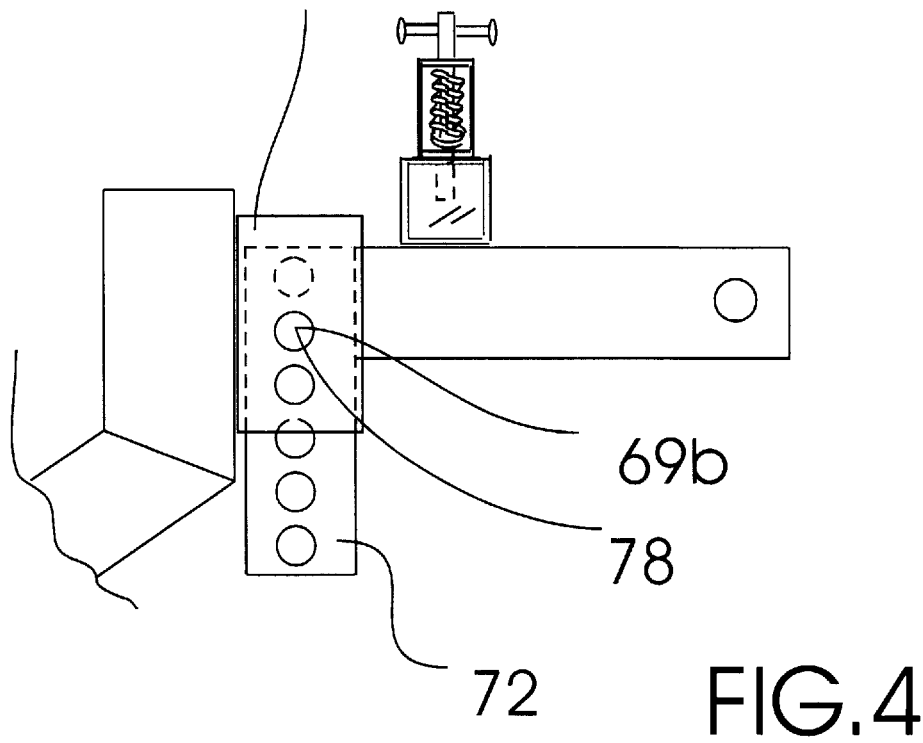
FIG. 4 is a side plan view showing the vertical shoe attachment tube of the height adjustment mechanism positioned between the two identical spaced channel connector plates with one of the connecting aperture pairs of the vertical show attachment tube in alignment with one of the pairs of vertical showed attachment tube attachment apertures of the spaced channel connector plates.
Figure 3:
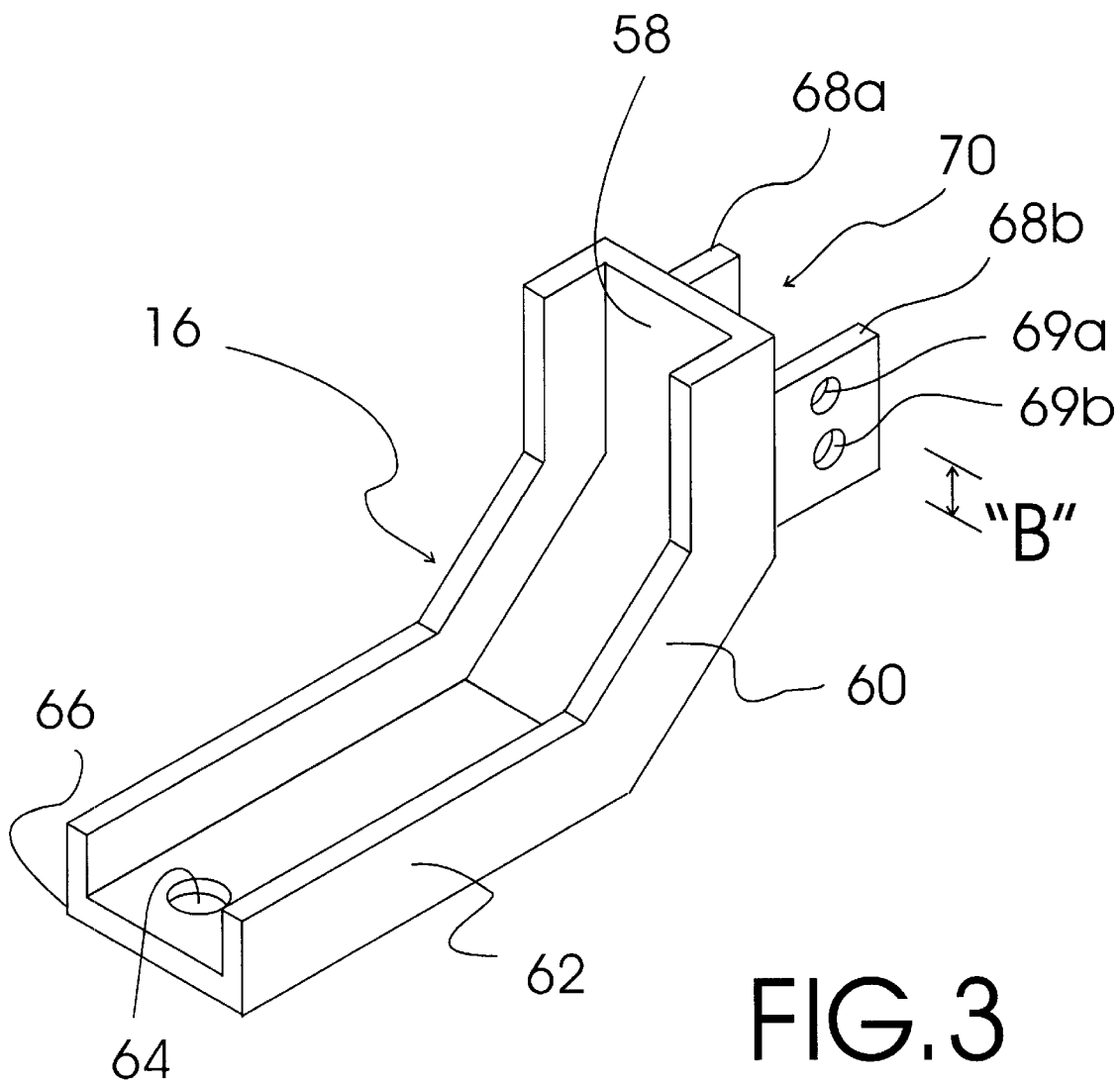
FIG. 3 is a perspective of the adjustable height cycle front tire receiving shoe in isolation showing the vertical channel portion, the diagonal channel portion, the horizontal channel portion, the pin receiving aperture formed into a rear end of the horizontal channel portion, and the two identical spaced channel connector plates of the height adjustment mechanism each having vertical shoe attachment tube attachment apertures provided therethrough.

With reference to FIG. 3, adjustable height cycle front tire receiving shoe 16 is of metal construction and includes a vertical channel portion 58, a diagonal channel portion 60, a horizontal channel portion 62, a pin receiving aperture 64 formed into a rear end 66 of horizontal channel portion 62, and two identical spaced channel connector plates 68a, 68b. Identical spaced channel connector plates 68a, 68b are rectangular shaped and extend away from a back surface of vertical channel portion 58. The two identical spaced channel connector plates 68a, 68b each have two vertical shoe attachment tube attachment apertures 69a, 69b that are spaced on centers a distance "B" of two inches. Channel connector plates 68a, 68b form a first portion of a height adjustment mechanism, generally designated 70 (FIG. 1) used to adjust the height of adjustable height cycle front tire receiving shoe 16 with respect to hitch connecting structure 12 (FIG. 2). With continued reference to FIG. 2, a vertical shoe attachment tube 72 forms a second portion of shoe heigth adjustment mechanism 70. Vertical shoe attachment tube 72 is a length of square cross section metal tubing having an upper end 74 welded to a far end 76 of hitch connecting structure 12 and six pairs of connecting aperture pairs 78 spaced along the length thereof on centers "A" of one inch. Referring to FIG. 4, vertical attachment tube 72 is fastened to connector plates 68a, 68b by inserting vertical attachment tube 72 between connector plates 68a, 68b and aligning one of the six pairs of connecting aperture pairs 78 with one of the two pairs of vertical shoe attachment tube attachment apertures 69a or 69b and then, with reference back to FIG. 1, inserting a connecting bolt 80 of a connecting bolt assembly 18a, 18b therethrough. Connecting bolt 80 is secured with a connecting nut 82. Both connecting bolt assemblies 18a, 18b can be used by aligning two of the six pairs of connecting aperture pairs 78 with the two pairs of vertical shoe attachment tube attachment apertures 69a, 69b and then, with reference back to FIG. 1, inserting connecting bolts 80 therethrough. Each connecting bolt 80 is secured with a connecting nut 82 as previously described.

Tire ramp 20 is of metal construction and includes a ramp channel member 84 terminating in one end 86 in a rectangular ramp alignment inset 88 that is positionable into rear end 66 of horizontal channel portion 62. A cylindrical ramp securing pin 90 extends away from an under surface of ramp alignment inset 88 that is sized to frictionally engage ramp pin receiving aperture 64 to detachably connect tire ramp 20 to horizontal channel portion 62. Tire ramp 20 is connected to assist the user in positioning the front tire of the motorcycle to be towed into tire receiving shoe 16.

Once the front tire of the motorcycle is positioned into tire receiving shoe 16, tire ramp 20 is detached from horizontal channel portion 62 and the two adjustable length nylon cycle securing strap assemblies 24a, 24b are secured to the handle bars of a motorcycle to be towed.

It can be seen from the preceding description that a cycle trailer hitch adapter has been provided that is connectable to the rear of a vehicle for towing a motorcycle behind the vehicle; that is attachable to a vehicle with a receiver hitch connection; and that includes a hitch connecting structure insertable into and lockable in connection with a receiver hitch, a cycle securing assembly in connection with the connecting structure, an adjustable height cycle front tire receiving shoe having a shoe height adjustment mechanism including a connector bolt assembly, and a tire ramp that is detachably securable to the cycle front tire receiving shoe; the cycle securing assembly including two adjustable length cycle securing straps, a removable strap spacing and cinch bar, and a spring loaded locking pin assembly including a spacing and cinch bar guide tube; the spring loaded locking pin assembly being attached to a top surface of the hitch connecting structure and including a slidably entrapped locking pin, a locking pin biasing spring, a retaining pin extending radially from the locking pin, a retaining pin insertion detent formed into the sidewall of a biasing spring retaining structure, and a spacing and cinch bar guide tube sized and shaped to slidingly receive therein the spacing and cinch bar when the locking pin is withdrawn therefrom and held in a retracted position by positioning the retaining pin into the retaining pin insertion indent; the spacing and cinch bar having strap connecting slots formed through the ends thereof and a centrally located locking pin receiving aperture formed into a top surface thereof; the slidably entrapped locking pin being of sufficient length and biased into a position by the locking pin biasing spring to engage the centrally located locking pin receiving aperture formed into the top surface of the spacer and cinch bar when the center of the spacer and cinch bar is positioned within the spacing and cinch bar guide tube; the adjustable height cycle front tire receiving shoe having a vertical channel portion, a diagonal channel portion, a horizontal channel portion, a pin receiving aperture formed into a rear end of the horizontal channel portion, and two identical spaced channel connector plates extending away from a back surface of the vertical channel portion; the two identical spaced channel connector plates forming a portion of the height adjustment mechanism; each channel connector plate having two vertical shoe attachment tube attachment apertures provided therethrough; the tire ramp including a ramp channel member terminating in one end in a ramp alignment inset that is positionable into the rear end of the horizontal channel portion of the cycle front tire receiving shoe; the ramp alignment inset having a ramp securing pin extending away from an under surface thereof that is sized to frictionally engage the ramp pin receiving aperture formed into a rear end of the horizontal channel portion; the hitch connecting structure having a hitch securing pin aperture formed therethrough at one end thereof and a vertical shoe attachment tube that forms another portion of the shoe height adjustment mechanism attached to a far end thereof; the connector bolt assembly including a connector bolt and a companionately threaded connector nut; the vertical shoe attachment tube being sized to fit laterally between the two identical spaced channel connector plates and having a number of connecting aperture pairs spaced along the length thereof; the connector bolt assembly being simultaneously securable through one of the two vertical shoe attachment tube attachment apertures of each spaced connector plate and one pair of the number of connecting aperture pairs of the vertical shoe attachment tube to affix the adjustable height front tire receiving shoe to the hitch connecting structure.

It is noted that the embodiment of the cycle trailer hitch adapter described herein in detail for exemplary purposes is of course subject to many different variations in structure, design, application and methodology. Because many varying and different embodiments may be made within the scope of the invention concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cycle trailer hitch adapter that is securable to a receiver hitch connection attached to a towing vehicle, said cycle trailer hitch adapter comprising:

a hitch connecting structure insertable into and lockable in connection with a receiver hitch;

a cycle securing assembly in connection with said connecting structure;

an adjustable height cycle front tire receiving shoe having a shoe height adjustment mechanism including a connector bolt assembly; and a tire ramp that is detachably securable to said cycle front tire receiving shoe;

said cycle securing assembly including two adjustable length cycle securing straps, a removable strap spacing and cinch bar, and a spring loaded locking pin assembly including a spacing and cinch bar guide tube;

said spring loaded locking pin assembly being attached to a top surface of said hitch connecting structure and including a slidably entrapped locking pin, a locking pin biasing spring, a retaining pin extending radially from said locking pin, a retaining pin insertion detent formed into said sidewall of a biasing spring retaining structure, and a spacing and cinch bar guide tube sized and shaped to slidingly receive therein said spacing and cinch bar when said locking pin is withdrawn therefrom and held in a retracted position by positioning said retaining pin into said retaining pin insertion indent;

said spacing and cinch bar having strap connecting slots formed through both ends thereof and a centrally located locking pin receiving aperture formed into a top surface thereof;

said slidably entrapped locking pin being of sufficient length and biased into a position by said locking pin biasing spring to engage said centrally located locking pin receiving aperture formed into said top surface of said spacer and cinch bar when said center of said spacer and cinch bar is positioned within said spacing and cinch bar guide tube;

said adjustable height cycle front tire receiving shoe having a vertical channel portion, a diagonal channel portion, a horizontal channel portion, a pin receiving aperture formed into a rear end of said horizontal channel portion, and two identical spaced channel connector plates extending away from a back surface of said vertical channel portion;

said two identical spaced channel connector plates forming a portion of said height adjustment mechanism;

each channel connector plate having two vertical shoe attachment tube attachment apertures provided therethrough;

said tire ramp including a ramp channel member terminating in one end in a ramp alignment inset that is positionable into said rear end of said horizontal channel portion of said cycle front tire receiving shoe;

said ramp alignment inset having a ramp securing pin extending away from an under surface thereof that is sized to frictionally engage said ramp pin receiving aperture formed into a rear end of said horizontal channel portion;

said hitch connecting structure having a hitch securing pin aperture formed therethrough at one end thereof and a vertical shoe attachment tube that forms another portion of said shoe height adjustment mechanism attached to a far end thereof;

said connector bolt assembly including a connector bolt and a companionately threaded connector nut;

said vertical shoe attachment tube being sized to fit laterally between said two identical spaced channel connector plates and having a number of connecting aperture pair spaced along said length thereof;

said connector bolt assembly being simultaneously securable through one of said two vertical shoe attachment tube attachment apertures of each spaced connector plate and one pair of said number of connecting aperture pairs of said vertical shoe attachment tube to affix said adjustable height front tire receiving shoe to said hitch connecting structure.

* * * * *